(12) United States Patent
Nordback

(10) Patent No.: US 10,681,317 B2
(45) Date of Patent: Jun. 9, 2020

(54) COLOR CORRECTION METHOD, SYSTEM, AND COMPUTER-READABLE MEDIUM

(71) Applicant: KONICA MINOLTA LABORATORY U.S.A., INC., San Mateo, CA (US)

(72) Inventor: Kurt Nathan Nordback, Boulder, CO (US)

(73) Assignee: KONICA MINOLTA LABORATORY U.S.A., INC., San Mateo, CA (US)

(*) Notice: Subject to any disclaimer, the term of this patent is extended or adjusted under 35 U.S.C. 154(b) by 0 days.

(21) Appl. No.: 15/940,327

(22) Filed: Mar. 29, 2018

(65) Prior Publication Data

US 2019/0306477 A1 Oct. 3, 2019

(51) Int. Cl.
*H04N 9/31* (2006.01)
*G06T 7/90* (2017.01)
*G06T 11/00* (2006.01)

(52) U.S. Cl.
CPC .......... *H04N 9/3182* (2013.01); *G06T 7/90* (2017.01); *G06T 11/001* (2013.01); *H04N 9/3147* (2013.01); *H04N 9/3194* (2013.01); *G06T 2207/10024* (2013.01); *G06T 2207/30176* (2013.01)

(58) Field of Classification Search
CPC ........................... H04N 9/3182; H04N 1/2369
See application file for complete search history.

(56) References Cited

U.S. PATENT DOCUMENTS

| | | | |
|---|---|---|---|
| 2004/0070565 A1* | 4/2004 | Nayar | G06K 9/4661 345/156 |
| 2013/0096392 A1* | 4/2013 | Adams | A61B 5/0075 600/301 |
| 2014/0201126 A1* | 7/2014 | Zadeh | G06K 9/627 706/52 |

(Continued)

FOREIGN PATENT DOCUMENTS

JP 2010-119017 A 5/2010

*Primary Examiner* — Paulos M Natnael
(74) *Attorney, Agent, or Firm* — Squire Patton Boggs (US) LLP

(57) ABSTRACT

In a color correction method, a reference area is selected in a document page, which is rendered to produce image data. The reference area can be a company logo, a letter or character in a line of text, or other graphic object. The reference area need not be a set calibration chart. The image data is used by a projector to display the document page on a screen. Ambient light may cause colors in the displayed document page to be noticeably different from the intended colors specified in the document page. A camera takes a picture of the displayed document page, and a target area is identified in the camera image based on a characteristic of the reference area that was previously selected. Corrected image data is generated based on a color difference between the reference area and the target area. The projector uses the corrected image data to display the document page, this time with colors that are closer to or the same as the intended colors. The cycle may be repeated on the next document page, in which case the reference and target areas may differ from those of the previous cycle.

13 Claims, 11 Drawing Sheets

(56) References Cited

U.S. PATENT DOCUMENTS

| | | | |
|---|---|---|---|
| 2015/0146224 A1* | 5/2015 | Shimamura | H04N 1/00082 358/1.13 |
| 2018/0020127 A1* | 1/2018 | Kim | H04N 1/6027 |
| 2018/0204111 A1* | 7/2018 | Zadeh | G06N 3/0454 |

* cited by examiner

COLOR CORRECTION METHOD, SYSTEM, AND COMPUTER-READABLE MEDIUM

FIELD

This disclosure relates generally to image processing and, more particularly, to color correction performed during image display.

BACKGROUND

When a projector is used to give a presentation, the color of images may be affected by ambient light, color drift in the projector light source, or the condition of the screen on which images are projected. Although chromatic adaptation in human vision generally works well to maintain constant perceived color under different ambient light conditions, there are times when the color temperature of ambient light, reflectance of the screen, and other factors result in noticeable color shifts. One may want to avoid color shifts for various reasons. For example, a presentation may involve color as a topic of technical or artistic discussion. In addition, companies are usually deeply concerned about the color of their logos, so a person making a presentation to or on behalf of a particular company would want the logo to have the proper color. Further, a presentation may include images of people, so it is important that skin tone be displayed properly to avoid any distraction from the message of the presentation. In general, ensuring that colors are displayed properly helps to make an effective presentation.

Various approaches have been taken to compensate for color shifts, but those approaches have drawbacks. For example, when a light source is used to pass light through a digital image in a projector, color ratios in the light source may be adjusted to compensate for color shifts. However, color adjustment of the light source alone may not be enough to eliminate color shift. Also, the light source may have degraded over time, becoming another source of color shift. If so, the light source cannot be relied upon to produce colors with accuracy. In another example, as disclosed in JP 2010-119017 A, a calibration chart of black, white and various colors is displayed prior to the presentation. Color ratios in the original document image are adjusted based on a photograph of the calibration chart, and then the adjusted document image is used by the projector. However, ambient conditions may change during the course of a presentation, and it is not practical to display the calibration chart during the middle of the presentation. In a formal setting, the presenter may prefer that meeting attendees not see a calibration chart. Although calibration could be performed earlier before attendees arrive, there is a risk that ambient conditions may change significantly by the time the presentation starts, such as may occur after sunset in a conference room with windows. In general, a one-time calibration approach would fail to compensate for color shifts that can sometimes occur after calibration. Moreover, calibration based on a predefined target requires an extra step that users may prefer to avoid. Accordingly, there is a need for a way to correct color shifts during a presentation.

SUMMARY

Briefly and in general terms, the present invention is directed to a method, system, and non-transitory computer readable medium for color correction.

In aspects of the invention, a method comprises performing a document page handling process comprising processing, by a computer, a document page. The processing comprises selecting a reference area in the document page, determining characteristics of the reference area, and rendering the document page to produce image data. The document page handling process comprises sending the image data to a projector configured to use the image data to display the document page on a screen, and performing a color correction process for the displayed document page. The color correction process comprises receiving, by the computer, a camera image of the displayed document page, identifying a target area in the received camera image based on at least one of the characteristics of the reference area, generating corrected image data based on a color difference between the reference area and the target area, and sending the corrected image data to the projector, the projector configured to use the corrected image data to display the document page.

In aspects of the invention, a system comprises a computer, a projector, a screen, and a camera. The computer performs a document page handling process that comprises processing a document page. The processing comprises selecting a reference area in the document page, determining characteristics of the reference area, and rendering the document page to produce image data. The document page handling process comprises sending the image data to the projector, which is configured to use the image data to display the document page on the screen. The document page handling process comprises performing a color correction process for the displayed document page. The color correction process comprises receiving a camera image of the displayed document page, identifying a target area in the received camera image based on at least one of the characteristics of the reference area, generating corrected image data based on a color difference between the reference area and the target area, and sending the corrected image data to the projector, which is configured to use the corrected image data to display the document page.

In aspects of the invention, a non-transitory computer readable medium has stored thereon computer readable instructions that, when executed by one or more processors of a system, cause the system to perform a color correction method. The system comprising a computer, a projector, a screen, and a camera. The color correction method comprises performing a document page handling process. The document page handling process comprises processing, by the computer, a document page. The processing comprises selecting a reference area in the document page, determining characteristics of the reference area, and rendering the document page to produce image data. The document page handling process comprises sending the image data to the projector configured to use the image data to display the document page on the screen, and performing a color correction process for the displayed document page. The color correction process comprises receiving, by the computer, a camera image of the displayed document page, identifying a target area in the received camera image based on at least one of the characteristics of the reference area, generating corrected image data based on a color difference between the reference area and the target area, and sending the corrected image data to the projector, which is configured to use the corrected image data to display the document page.

The features and advantages of the invention will be more readily understood from the following detailed description which should be read in conjunction with the accompanying drawings.

DETAILED DESCRIPTION

Figure 1:
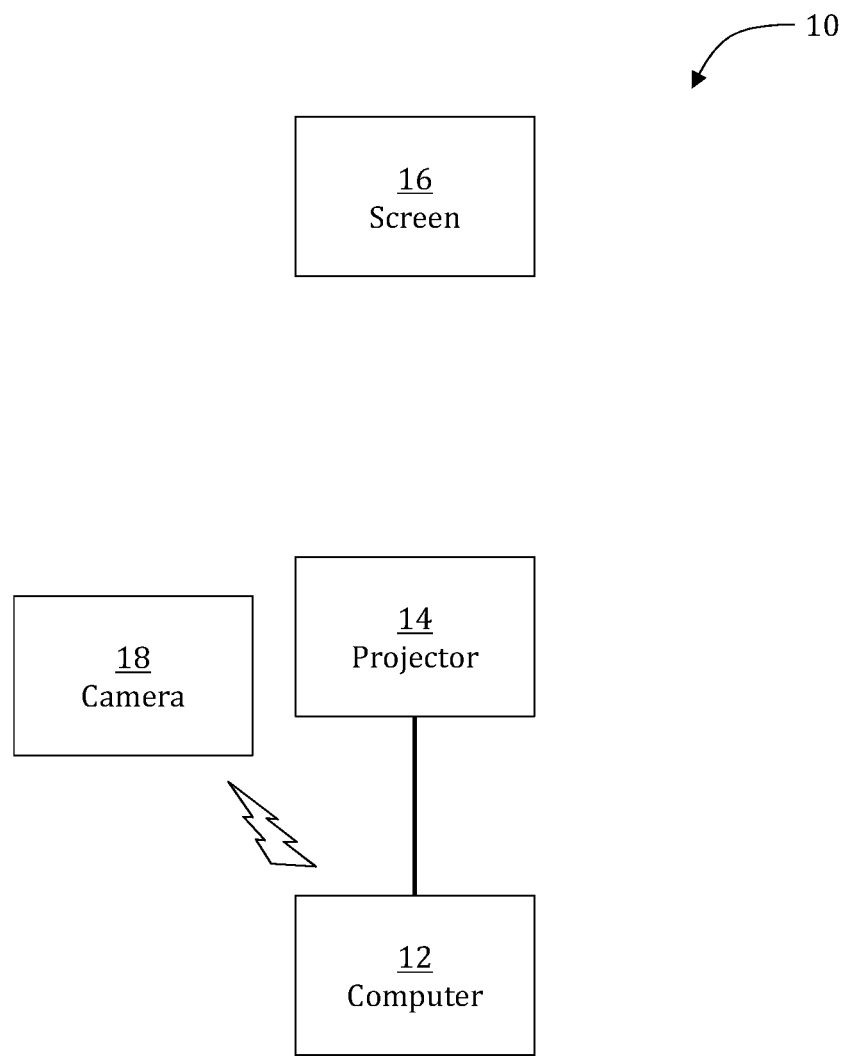
FIG. 1 is a schematic block diagram showing an example display system.

Referring now in more detail to the drawings for purposes of illustrating non-limiting examples, wherein like reference numerals designate corresponding or like elements among the several views, there is shown in FIG. 1 example system 10 for closed-loop color correction during image display. System 10 includes computer 12, projector 14, screen 16, and camera 18.

Screen 16 has a surface on which images are projected by projector 14. For example, when projector 14 is in front of screen 16 as illustrated, screen 16 may be an opaque surface made of a flexible fabric or a rigid material. Images are projected onto the opaque surface, and the opaque surface reflects light to allow people (viewers) in front of screen 16 to see the projected image.

Projector 14 is configured to project an image through the air and on screen 16 based on image data instead of traditional film. The image data is derived from a source document (e.g., a PPTX slide presentation file) by computer 12 and provided to projector 14. Camera 18 is configured to capture an image of what people (viewers) see on screen 16. Ambient conditions may cause color shift whereby colors in the image on screen 16 differ from the intended colors in the source document. The captured image (referred to as a camera image) is fed back to computer 12, closing the loop in the system. Computer 12 uses the camera image to determine a correction, if necessary, to the image data to bring the displayed colors closer to the intended colors. The corrected image data is used by projector 14 to display a corrected image with reduced color shift. Unlike conventional approaches, computer 12 need not rely on a set pattern, such as calibration chart, with a fixed set of colors that are known in advance. As described below, computer 12 selects an appropriate reference area of practically any color and position in the source document, identifies a corresponding target area in the camera image, and generates the corrected image data based on a color difference between the reference area and the target area.

Figure 2:
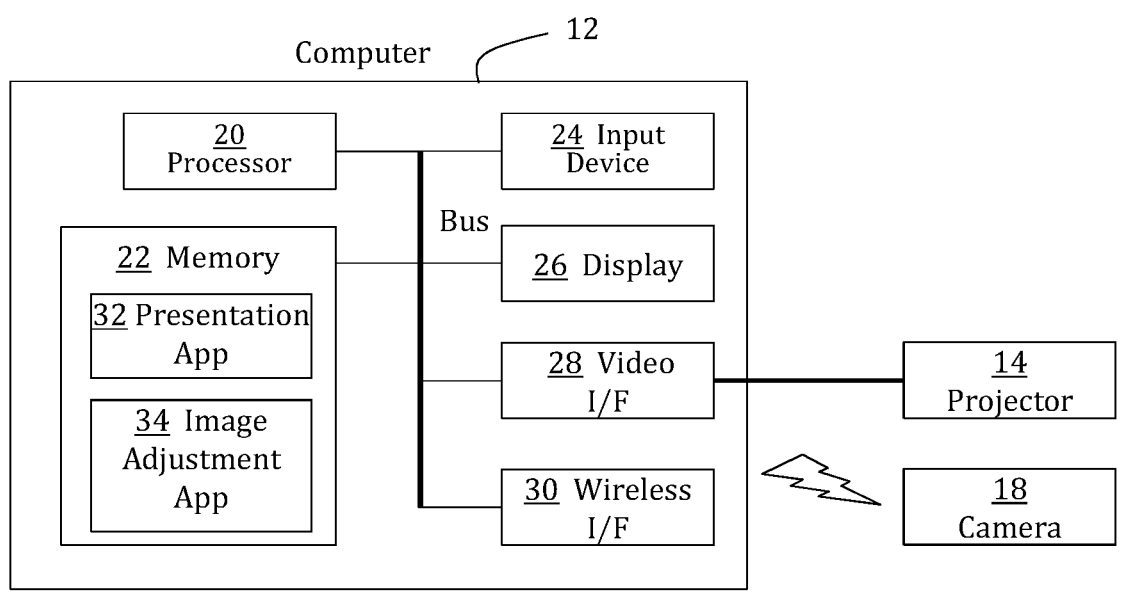
FIG. 2 is a schematic block diagram showing an example computer in the display system.

In FIG. 2, example computer 12 comprises one or more processors 20, one or more memory devices 22, one or more input devices 24, display 26, video interface 28, and wireless interface 30. For example, computer 12 may be a laptop computer. Other examples include without limitation a computer workstation, desktop computer, laptop computer, tablet computer, and smartphone. The one or more processors 20 are collectively referred to as computer processor 20. Computer processor 20 includes circuits and electronic components that execute instructions of an operating system, presentation software application (presentation app) 32, image adjustment software application (image adjustment app) 34, and rendering software. These software programs (the "computer software") enable computer 12 to perform various processes and functions described herein.

Portions of the computer software may be developed using a library of programming functions found in or similar to the Python Imaging Library (PIL) or OpenSource Computer Vision (OpenCV) for image processing.

The one or more memory devices 22 are collectively referred to as computer memory 22. Computer memory 22 includes any one or a combination of random-access memory (RAM) modules, read-only memory (ROM) modules, and other electronic data storage devices. Computer memory 22 may include a mass storage type of device such as a solid-state flash drive, CD drive, or DVD drive. Computer memory 22 includes a non-transitory computer readable medium that stores the computer software, document pages, and other data associated with various processes described herein.

The one or more input devices 24 are collectively referred to as computer input device 24. Computer input device 24 may include any one or more of a keyboard with buttons, touch-sensitive screen, microphone, handheld remote control, and other means for user input. Computer display 26 may include a liquid crystal display (LCD) or other type of visual display device. Computer input device 24 may be used by a user to navigate through a graphic user interface of presentation app 32 shown on computer display 26 to allow the user to select document pages to be displayed by projector 14.

Video interface (I/F) 28 is configured to allow computer 12 to communicate with projector 14. Video I/F 28 includes circuits and electronic components that enable computer 12 to send image data as signals compatible with projector 14. Video I/F 30 includes an electrical or optical connector (e.g., a socket or plug) in communication with projector 14. For example, video interface I/F 28 may allow communication using High-Definition Multimedia Interface (HDMI), component video, composite video, and/or other technology.

Wireless interface (I/F) 30 is configured to allow over-the-air communications between computer 12 and camera 18. Wireless interface I/F 30 includes circuits and electronic components that enable computer 12 to receive camera images as signals communicated through the air. For example, wireless interface I/F 30 may allow communication using Wi-Fi, Bluetooth, and/or other technology.

Alternatively, wireless I/F 30 may be replaced with a data interface (I/F) configured to allow communication with camera 18 via a data cable. For example, the data I/F may allow communication through a Lightning connector (developed by Apple Inc., Cupertino, Calif.) or USB-type connector.

Figure 3:
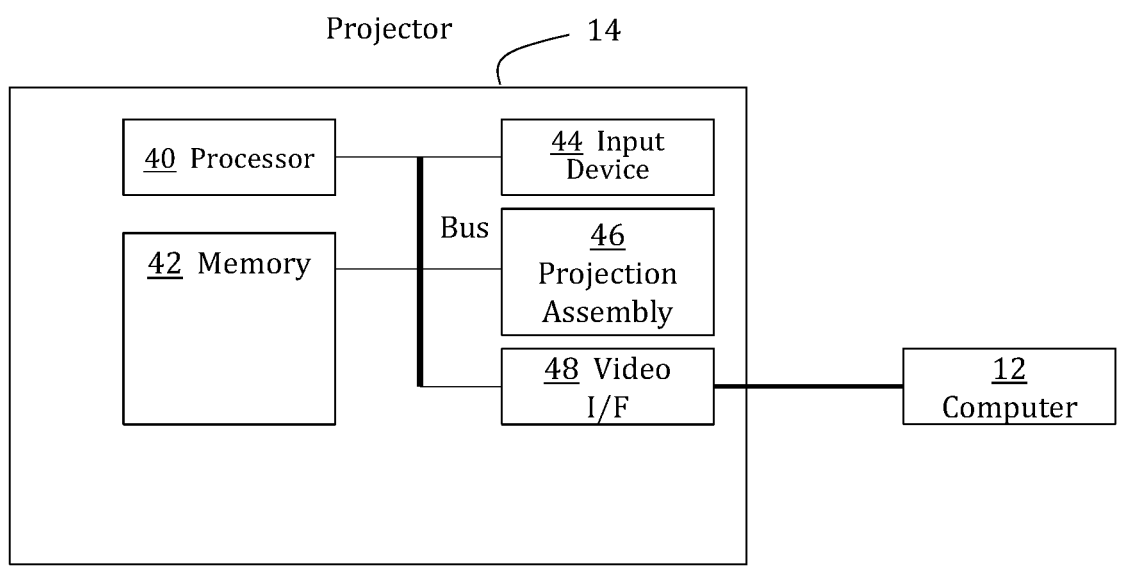
FIG. 3 is a schematic block diagram showing an example projector in the display system.

In FIG. 3, example projector 14 comprises one or more processors 40, one or more memory devices 42, one or more input devices 44, projection assembly 46, and video interface 48. The one or more processors 40 are collectively referred to as projector processor 40. Projector processor 40 includes circuits and electronic components that execute instructions of an image projection software application (projection app). The projection app enables projector 14 to perform various processes and functions described herein.

The one or more memory devices 42 are collectively referred to as projector memory 42. Projector memory 42 includes any one or a combination of random-access memory (RAM) modules, read-only memory (ROM) modules, and other electronic data storage devices. Projector memory 42 may include a mass storage type of device such as a solid-state flash drive. Projector memory 42 includes a non-transitory computer readable medium that stores the projection app, and optionally image data and other data associated with various processes described herein.

The one or more input devices 44 are collectively referred to as projector input device 44. Projector input device 44 may include any one or more of a control panel with buttons, a touch-sensitive screen, and other means for input to allow the user, for example, to turn the projector on and off.

The configuration of projection assembly 46 depends upon the image creation technology being used by projector 14. For example, projector 14 may be an LCD projector in which projection assembly 46 may comprise a light source and three sets of dichroic filters and LCD panes, one for each color component, which generate light beams that are combined to form a base image in projection assembly 46. The base image is then projected onto screen 16. Other technologies may be used, including without limitation Digital Light Processing (DLP) and Liquid Crystal Technology on Silicon (LCoS).

Video interface (I/F) 48 is configured to allow projector 14 to communicate with computer 12. Video I/F 48 includes circuits and electronic components that enable projector 14 to obtain image data. Video I/F 48 includes an electrical or optical connector (e.g., a socket or plug) in communication with computer 12. For example, video interface I/F 48 may allow communication using High-Definition Multimedia Interface (HDMI), component video, composite video, and/or other technology.

Figure 4:
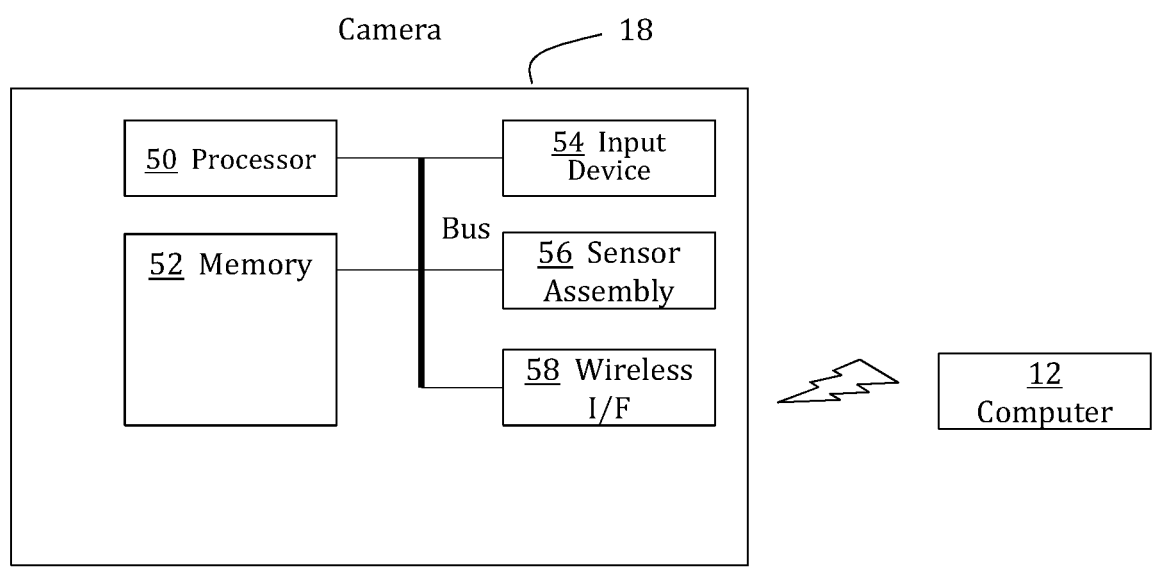
FIG. 4 is a schematic block diagram showing an example camera in the display system.

In FIG. 4, example camera 18 comprises one or more processors 50, one or more memory devices 52, one or more input devices 54, sensor assembly 56, and wireless interface 58. The one or more processors 50 are collectively referred to as camera processor 50. Camera processor 50 includes circuits and electronic components that execute instructions of an image capture software application (camera app). The camera app enables camera 18 to perform various processes and functions described herein.

The one or more memory devices 52 are collectively referred to as camera memory 52. Camera memory 52 includes any one or a combination of random-access memory (RAM) modules, read-only memory (ROM) modules, and other electronic data storage devices. Camera memory 52 may include a mass storage type of device such as a solid-state flash drive. Camera memory 52 includes a non-transitory computer readable medium that stores the camera app, and optionally other data associated with various processes described herein.

The one or more input devices 54 are collectively referred to as camera input device 54. Camera input device 54 may include any one or more of a keyboard with buttons, touch-sensitive screen, microphone, and other means for input to allow the user, for example, to turn the camera on and off and to start the camera app.

Sensor assembly 56 comprises a lens and an image sensor. The image sensor may be of any type, including without limitation sensors capable of converting photons to electrical signals. Example sensor types include without limitation charge-coupled devices (CCD) and complementary metal-oxide-semiconductors (CMOS). Readouts from the image sensor are used by the camera app to generate a camera image in a format compatible with image adjustment app 34 of computer 12. Examples of camera image formats include without limitation JPEG, PNG, and BMP. Screen 16 is in the field of view of sensor assembly 56.

Wireless interface (I/F) 58 is configured to allow over-the-air communications between camera 18 and computer 12. Wireless interface I/F 58 includes circuits and electronic components that enable camera 18 to send camera images as signals communicated through the air. For example, wireless interface I/F 58 may allow communication using Wi-Fi, Bluetooth, and/or other technology.

Alternatively, wireless I/F 58 may be replaced with a data interface (I/F) configured to allow communication with computer 12 via a data cable. For example, the data I/F may allow communication through a Lightning connector or USB-type connector.

Camera 18 may have additional functions, such as the capability to make telephone calls. For example, camera 18 may be a smartphone, computer workstation, desktop computer, laptop computer, or tablet computer. Camera 18 and computer 12 may be combined as a single apparatus. In addition, projector 14 may be combined with one or both of camera 18 and computer 12 to form a single apparatus.

FIGS. 5 and 6A-6D illustrate an example color correction method that may be used when presenting one or more images on screen 16. The image on screen 16 may be of text only, a combination of text and pictures (e.g., illustrations, photographs, graphs, diagrams, and the like), or pictures only. The image on screen 16 may be of a slide in a PowerPoint™ presentation, or a page in a Portable Document Format (PDF) document. The image may be a clone of something shown on display 26 of computer 12, which could be running a web browser to show a webpage, a photo viewing software to show a digital photograph, or a video viewing software to show a moving video. For moving video, it is possible to initiate color correction based on a user command received during a paused video frame or a non-moving segment of the video to accommodate a time delay in the feedback loop from camera 18 to computer 12 due to limitations in processing speed of camera 18 and computer 12. In general, the source document of the image displayed on screen 16 can be of any type that computer 12 can handle to produce image data usable by projector 14. The source document of the image is referred to herein as a "document page." The document page may stand alone, as in the case of a single JPEG file or single-page PDF file. Multiple document pages may form a group, referred to herein as an "electronic document." For example, an electronic document can be a PPT or PPTX file with multiple slides, or a PDF file with multiple pages. Presentation app 32, which is running in computer 12, is of a type appropriate for the document page. If the electronic document is a PPTX file, for example, presentation app 32 can be a slide presentation program.

Figure 5:
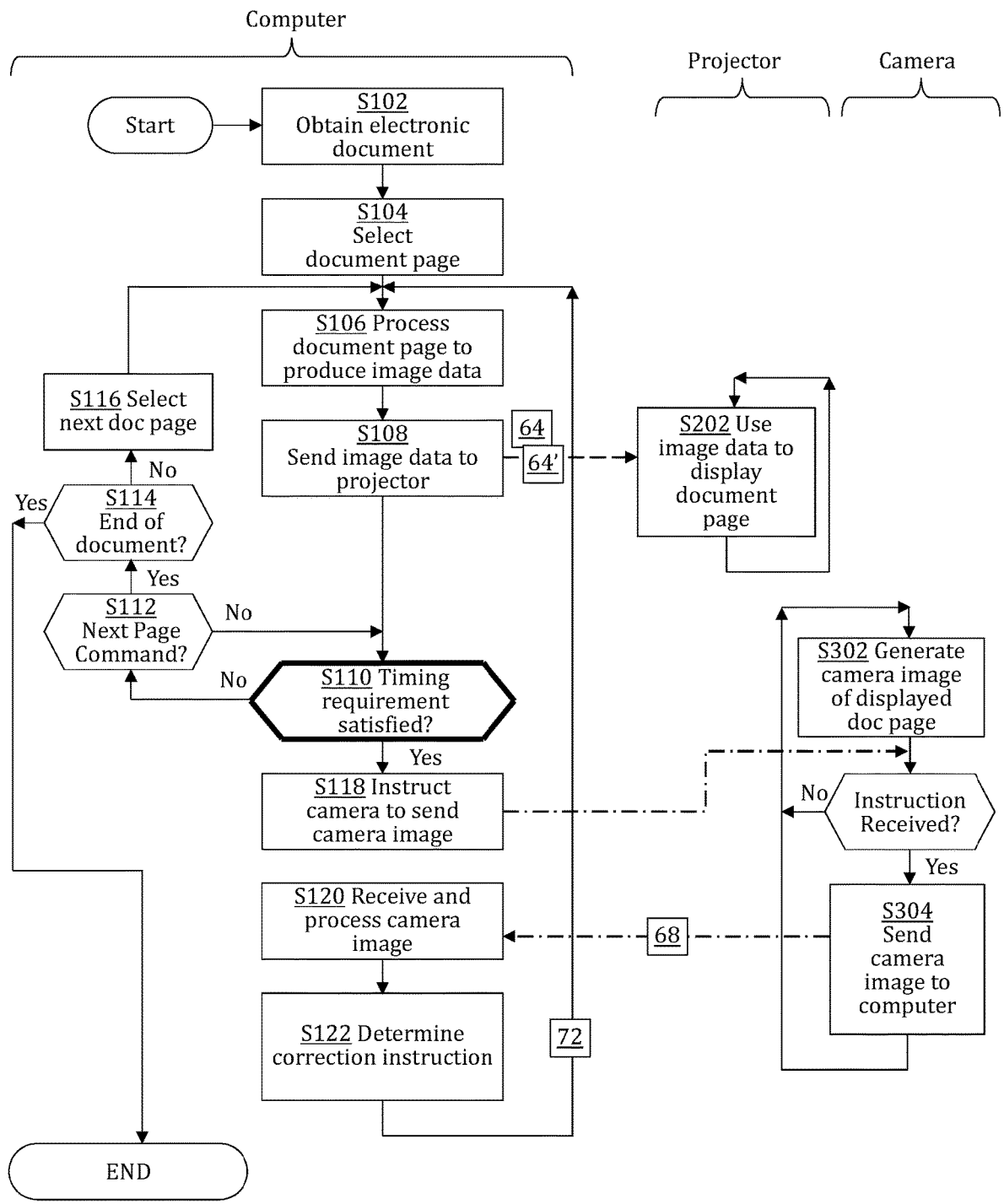
FIG. 5 is a flow diagram showing an example method for closed-loop color correction during a presentation.

At S102 in FIG. 5, computer 12 obtains an electronic document. At S104, computer 12 selects document page 60 (FIG. 6A) from the electronic document. For example, computer 12 may receive a PPTX file, and the selection of document page 60 may be based on user input to a slide presentation program, via computer input device 24, to display a particular slide.

At S106, computer 12 processes document page 60. S106 can be considered to be the start of a document page handling process. Processing at S106 comprises selecting reference area 62 (FIG. 6A) in document page 60, and determining characteristics of reference area 62. The characteristics may include a color property and a boundary property, as will be described below. To select reference area 62, computer 12 uses image adjustment app 34 to find an area in document page 60 that has uniform color throughout and that satisfies a minimum size requirement. Such an area is selected to be reference area 62, which will be used later in the feedback loop for color correction. Reference area 62 should be of sufficient size so that a corresponding area in the image on screen 16 will be clearly recognizable in the picture (the "camera image") that will be taken by camera 18 later. Reference area 62 should have a uniform color to facilitate a color comparison with the camera image.

Reference area 62 can be virtually anything in document page 60 that is found to have uniform color and sufficient size. For example and without limitation, reference area 62 can be a company logo, a character or letter within a line of text, the background of text, a portion of a pie chart, or other graphic object. Computer 12 analyzes document page 60 to find groups of connected pixels having the same (uniform) color property. The color property is defined in document page 60. Examples of a color property include without limitation one or a combination of: color constituents (e.g., red and green, with no blue); proportion of color constituents (e.g., 2 parts red to 1 part green and 0 part blue); intensity of color constituents (e.g., 120R and 60G to yield brown versus 240R and 120G to yield orange); and total intensity, T (e.g., T=120R+60G=180 versus T=240R+120G=360). The color property may be defined in document page 60 in other ways. For example and without limitation, the color property may be defined in document page 60 with a Hex color code, CMYK values, or HSL values.

To determine whether a group of uniformly colored pixels is an area of sufficient size, the number of pixels in each row and column within the group may be counted, averaged, and then compared to a minimum threshold number, as an example of a minimum size requirement. Other methods may be used to determine that reference area 62 is uniform in color throughout reference area 62, and to determine that reference area 62 is of a size that satisfies a minimize size requirement. Computer 12 may select the first area that satisfies both conditions for uniform color and size, or it may select the largest area among a plurality of areas that satisfy both conditions, or it may select an area closest to the center of document page 60 among a plurality of areas that satisfy both conditions. Other modes for selection may be used. When reference area 62 is selected, computer 12 may register the color property of reference area 62 in memory 22. Computer may also register in memory 22 the color properties of neighboring objects next to reference area 62 in document page 60.

Computer 12 may also determine a boundary property of reference area 62 by registering the position of pixels at the boundary of reference area 62. The boundary is defined by a change in color property from reference area 62 to a neighboring area. Examples of the boundary property include without limitation one or a combination of: the shape of reference area 62 (e.g., curved boundary, polygon boundary with straight sides, irregular shaped boundary); relative size (size of reference area 62 relative to the document page as a whole); and relative position (position of reference area 62 within the document page as a whole).

Instead of selecting only a single reference area, computer 12 may select a plurality of reference areas in document page 60. Each of the reference areas would satisfy conditions for uniform color and size, as described above. The plurality of reference areas would be used during a color correction process later.

Figure 6A:
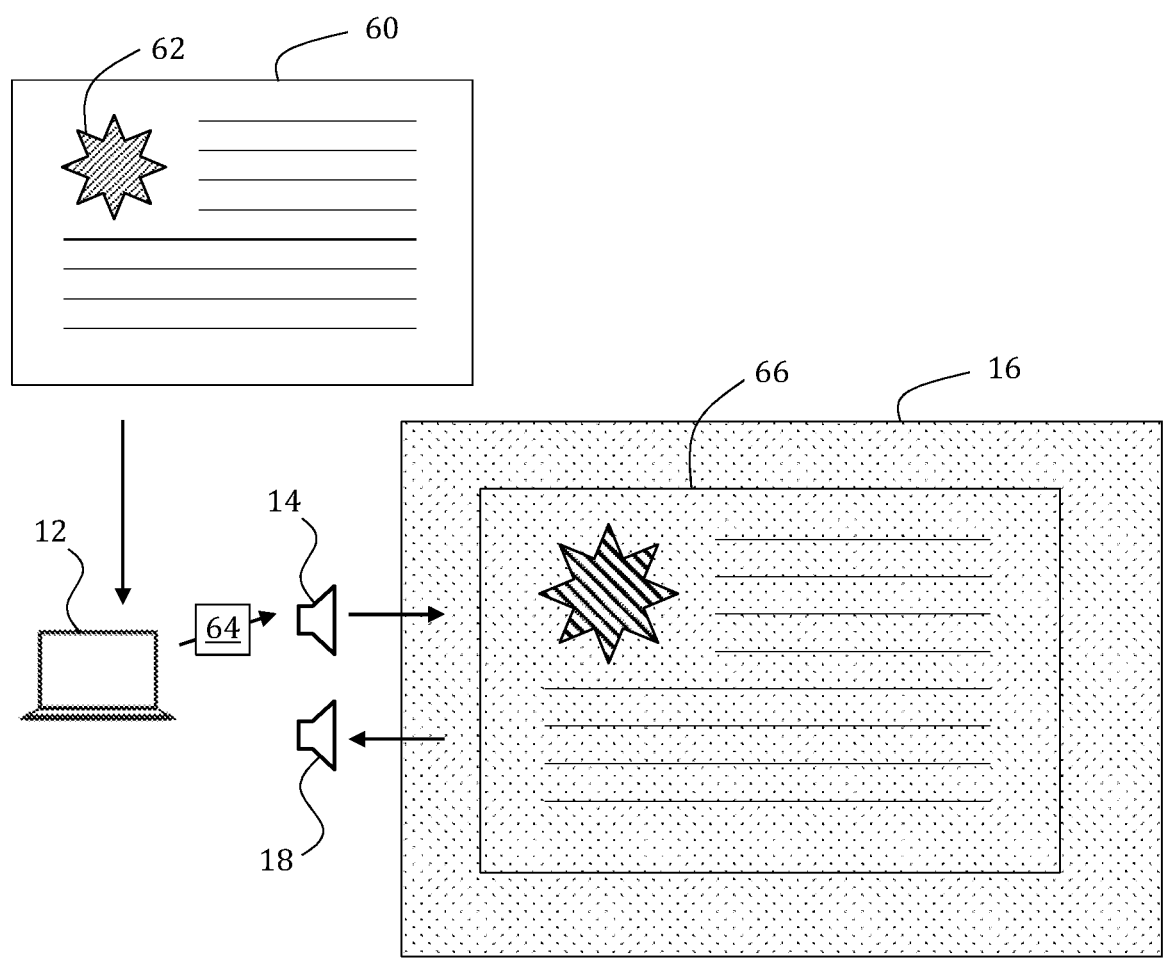
FIG. 6A is a diagram showing an example document page being displayed before color correction.
Figure 6B:
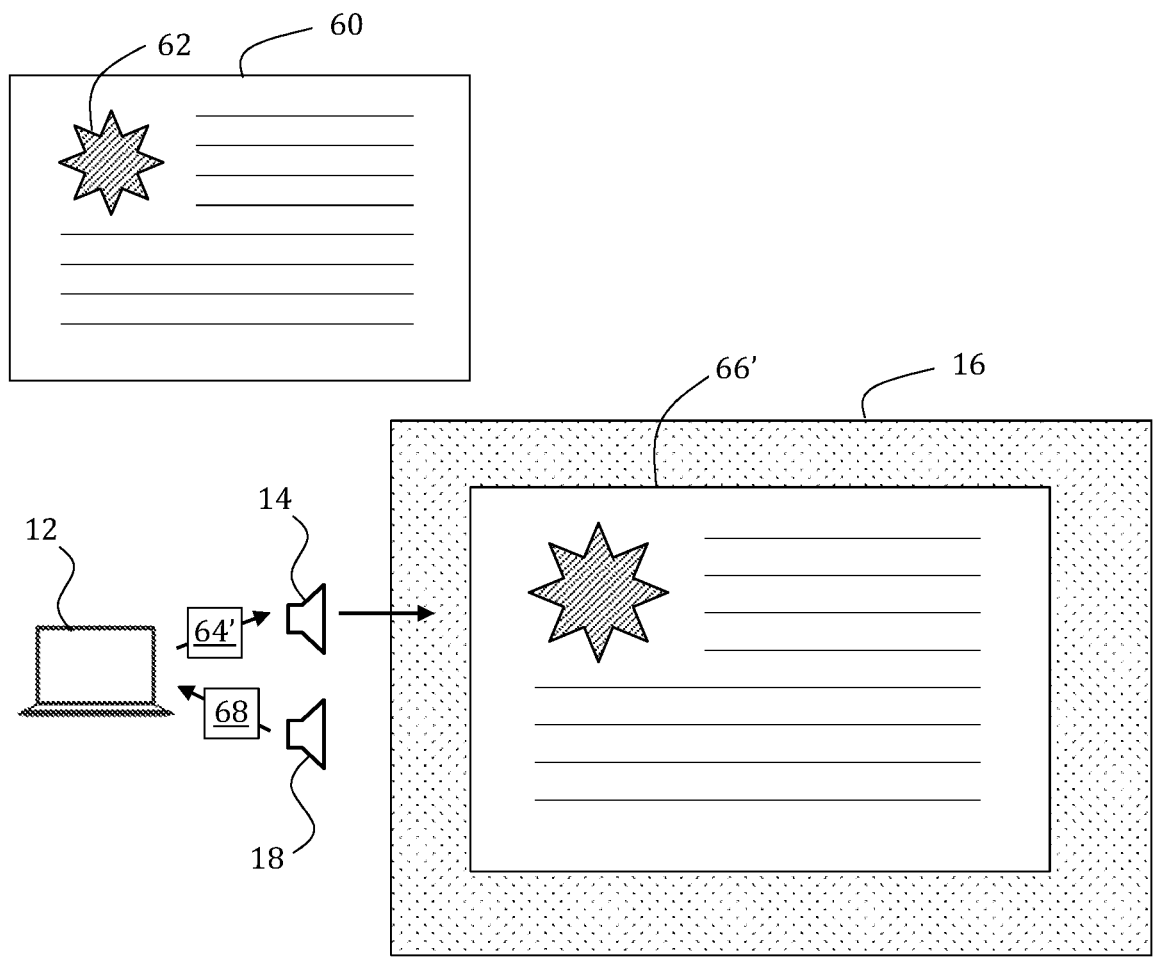
FIG. 6B is a diagram showing the document page being displayed after color correction.
Figure 6C:
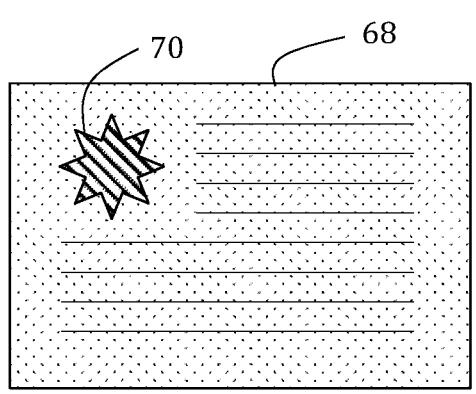
FIG. 6C is a diagram showing an example camera image used for color correction.

Processing of document page 60 at S106 comprises determining an identifying characteristic of document page 60. The identifying characteristic is registered in computer memory 22 and will be used later to distinguish the document page from surrounding objects in the camera image. The identifying characteristic may be defined by color properties of certain areas in document page 60. The identifying characteristic may be defined by pixels that correspond to abrupt transitions in color property between objects in document page 60. As shown in FIG. 6A for example, document page 60 may be a rectangular slide showing a star-shaped company logo. Computer 12 may register pixel positions that define document page 60 as an object having a rectangular boundary that encloses a 12-sided star at the top-left quadrant.

Processing of document page 60 at S106 comprises rendering document page 60 to produce image data 64 that will be used by projector 14. Image data 64 may be a rasterized version of document page 60. For example, the rasterized version may include pixels defined by red, green, and blue intensities if the RGB color space is used. The pixels may be defined according to the CMYK color space or other color space. Image data 64 may be based on assumptions in the computer software about ambient light conditions and screen conditions, but those assumptions may differ from actual conditions. When producing image data 64, it is possible that the computer software does not take into account a color shift in a light source in projector 14. The computer software may apply any rendering technique known in the art to produce image data 64.

At S108 in FIG. 5, image data 64 is sent to projector 14. At S202, projector 14 receives image data 64 and uses it to display a representation of document page 60 on screen 16. The displayed representation is referred to as a "displayed document page." Depending on ambient conditions, the colors in displayed document page 66 (FIG. 6A) may not appear as intended. In addition, displayed document page 66 may be skewed, resulting in a keystone effect that often occurs due to misalignment between the projector and screen and/or due to other factors.

At S110 in FIG. 5, computer 12 determines whether to perform a color correction process based on whether a timing requirement is satisfied. For example, the timing requirement may be to perform the color correction process for every new document page. Additionally or alternatively, the timing requirement may be to perform the color correction process repeatedly at a constant time interval. By using an internal clock, computer 12 can determine whether a time interval (e.g., 5 seconds or other time interval) has elapsed since a previous color correction process. Examples of time intervals include without limitation: at least 30 seconds, at least 1 minute, and at least 10 minutes. If the time interval has elapsed, the next color correction process is performed. The next color correction process could be performed for the same document page or a different one. Additionally or alternatively, the timing requirement may be to perform the color correction process in response to a user command received by computer 12. For example, the user command may be based on user input to presentation app 32, via computer input device 24, to perform the color correction process. The user command may be issued at any time during the presentation, such as when the user notices a color shift in displayed document page 66 due to a sudden change in lighting in a conference room. The user command may be issued during a paused video frame or during a non-moving segment of a video.

Meanwhile at S302 in FIG. 5, camera 18 generates an image of displayed document page 66. That image is referred to as the "camera image."

If the timing requirement is satisfied (S110: YES), the process may proceed to S118 where computer 16 sends an instruction to camera 18 to send camera image 68. At S304, camera 18 sends camera image 68 (FIG. 6B) in response to the instruction. At S120, computer 16 receives and processes camera image 68. S120 can be considered to be the start of a color correction process.

Processing at S120 in FIG. 5 involves identifying target area 70 (FIG. 6C) in the received camera image 68 based on at least one of the characteristics of reference area 62. The characteristics include the boundary property and the color property that were determined previously at S106. Computer 12 uses image adjustment app 34 to analyze camera image 68 and find an area of camera image 68 that corresponds to document page 60. For example, computer 12 may correct for any potential keystone effect using techniques known in the art, and then find an area of camera image 68 that sufficiently matches the identifying characteristic of document page 60. The identifying characteristic was determined previously at S106. Next, computer 12 may crop camera image 68 to include only the area that matched, thereby eliminating objects around screen 16. Next, computer 12 analyzes cropped camera image 68 to find an area that matches the boundary property of reference area 62. The boundary property was determined previously at S106.

As previously mentioned, the boundary property includes any of shape, relative size, and relative position of reference area 62. Computer 12 may identify an area under consideration (a "candidate area") in camera image 68 as a target area 70 on condition that the candidate area has a shape that is the same as or sufficiently similar to that of reference area 62, and/or has a relative size that is the same as or sufficiently similar to that of reference area 62, and/or has a relative position that is the same as or sufficiently similar to that of reference area 62. Computer 12 may determine sufficient similarity by first determining a difference between the properties (e.g., a difference between the shapes of the candidate and target areas, a difference between the relative sizes of the candidate and target areas, or a difference in the relative position of the candidate and target areas). Next, computer 12 compares the difference to a threshold requirement. The threshold requirement may be defined in terms of pixels or in another way. As shown for example in FIG. 6A, reference area 62 may be a 12-sided star that covers 5% of document page 60 and is located at the top-left quadrant of document page 60. Computer 12 may eliminate candidate areas in cropped camera image 68 that: do not have 12 sides, and/or are not in the top-left quadrant of cropped camera image 68, and/or do not cover 5% of cropped camera image 68.

Identification of target area 70 in camera image 68 may comprise determining a color property of a candidate area, and comparing the color property of reference area 62 and the color property of the candidate area. The comparison of color properties is performed to help ensure that target area 70 truly corresponds to reference area 62. This is based on an assumption that the correct target area will not have a color property (e.g., light blue) that is completely different from that of the reference area (e.g., deep orange). Two non-limiting examples are described below for identifying target area 70 based on the color property of reference area 62.

In a first example, computer 12 may identify a candidate area as being target area 70 on condition that the candidate area, as compared to reference area 62, has the same brightness relationship (e.g., brighter or darker) to neighboring objects. If reference area 62 is darker (lower total intensity) than neighboring objects in document page 60, computer 12 will eliminate candidate areas in camera image 68 that are brighter (greater total intensity) than neighboring objects.

In a second example, computer 12 may identify a candidate area in camera image 68 as being target area 70 on condition that the candidate area has a color property that satisfies a similarity requirement. The color property may be represented as a position in a multi-dimensional color space. Coordinates for the color position include values for each color constituent (e.g., red, green, and blue if the RGB color space is used). For a candidate area under consideration, computer 12 calculates distance D from the color position (e.g., r=240, g=240, b=0) of the candidate area to the color position (e.g., R=240, G=120, B=0) of reference area 62. For example, distance D may be calculated as:

$$D=\sqrt{(R-r)^2+(G-g)^2+(B-b)^2}$$

The distance is a measure of similarity or dissimilarity of color properties of the candidate area and reference area 62. Computer 12 may identify a candidate area as the target area on condition that the distance is less than a maximum distance threshold, as an example of similarity requirement. Other methods and similarity requirements may be used.

If computer 12 selected a plurality of reference areas in document page 60 at S106, then at S120, computer 12 would identify a plurality of corresponding target areas. Each target area may be identified in the manner discussed above, based on at least one of the characteristics of the corresponding reference area.

Next at S122 in FIG. 5, computer 12 determines correction instruction 72. Correction instruction 72 is returned to S106, where document page 60 may be rendered again. This time, document page 60 is rendered using correction instruction 72. Use of correction instruction 72 produces corrected image data 64', which is based on a color difference between reference area 62 and target area 70. Image adjustment app 34 determines correction instruction 72, which when applied at S106, results in corrected image data 64' that differs from previous image data 64. Correction instruction 72 can have an effect of increasing the similarity in the color properties of reference area 62 and the target area in the next camera image. For example, correction instruction 72 may reduce distance D between the color properties of reference area 62 and the target area in the next camera image.

Correction instruction 72 may encompass multiple color channels. For example, the color property of reference area 62 may be deep orange (e.g., R=240, G=120, B=0), and ambient light near screen 16 may have a green tint that causes the color property of target area 70 in camera image 68 to shift, resulting in light orange (e.g., r=240, g=180, b=0). The green tint might come from reflections from a green wall near screen 16. The difference between the two color properties is an increase of 60 in the green coordinate. To compensate for the increase in green, any of red, green, and blue may be adjusted. For pixels having a green coordinate of 0 (no green), the green coordinate cannot be decreased any further. Thus, correction instruction 72 may require that coordinates for blue and red be increased for those pixels. For pixels having a green coordinate from 1 and 60, correction instruction 72 may require that the green coordinate decreased by a fixed amount or by a certain percentage of the current green coordinate value. For pixels having a green coordinate greater than 60, the green coordinate may be decreased by subtracting 60. Image adjustment app 34 may determine correction instruction 72 from a lookup table stored in computer memory 22. The lookup table may include color adjustments to be made to a pixel based on its current color coordinates and based on the type of color shift. In this way, the correction instruction to compensate for a large increase in green may differ from that for a slight increase in green. Other approaches may be used for correcting color to produce corrected image data 64'.

If computer 12 selected a plurality of reference areas in document page 60 at S106, then at S122, computer 12 iterates through each of them to accumulate color adjustments to be included in correction instruction 72. For example, there would be a plurality of matched pairs of reference and target areas, so computer 12 may determine a set of color adjustments, in any way previously described, for each matched pair of reference and target areas. Each set may pertain to a certain area of document page 60 where the reference area is located or may pertain to a certain color present in the reference area.

While correction instruction 72 is described above in terms of the RGB color space, it is to be understood that correction instruction 72 may be defined in other terms. For example, document page 60 may define colors in terms of Hex color codes, so correction instruction 72 may be defined in terms of Hex color codes as well. This could facilitate rendering of document page 60 using correction instruction 72.

At S108 in FIG. 5, computer 12 sends corrected image data 64' to projector 14. Projector 14 uses corrected image data 64' to display the same document page again. This time, the colors of newly displayed document page 66' (FIG. 6B) are closer to those intended. Depending on the outcome at S110, camera 18 may send another camera image 68 to computer 12, which then performs another color correction process on the same document page. The next color correction process may result in colors in the displayed document page that are even closer to those intended.

If the timing requirement is not satisfied (S110: NO), the process may proceed to S112 where computer 16 checks for a next page command. The next page command is a command to display the next document page in the electronic document. For example, the user may enter a next page command to presentation app 32, via computer input device 24, to display the next document page. If NO at S112, the process may return to S110. If YES at S112, the process may proceed to S114, where computer 16 determines whether the current document page is at the end of the electronic document. If YES at S114, the process may end. If NO at S114, the process may proceed to S116 where computer 12 selects the next document page in the electronic document. Thereafter, the process returns to S106 to begin another document page handling process.

As indicated above, the document page handling process may repeat. In a first document page handling process, color correction is performed on document page 60. In the next (repeat) document page handling process, color correction may be performed on the next document page that was selected at S116.

Figure 6D:
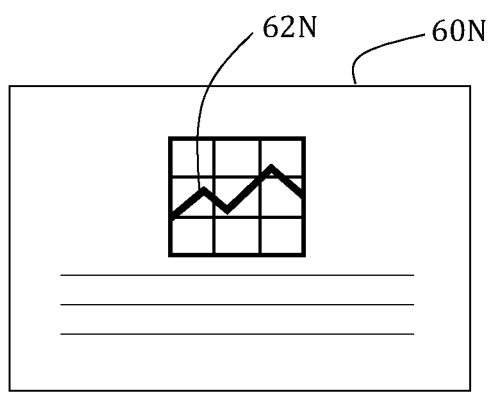
FIG. 6D is a diagram showing the next document page.

In FIG. 6D for example, next document page 60N may not have the star-shaped company logo that was in previous document page 60. Computer 12 uses image adjustment app 34 to find an area in next document page 60N that has uniform color throughout and that satisfies a minimum size requirement. In the illustrated example, next document page 60N contains a graph. Computer 12 may identify an area of uniform color and sufficient size in the graph as new reference area 62N. Thereafter, computer 12 will receive a camera image of the next document page, and will identify a target area in the received camera image based on at least one of the characteristics of new reference area 62N. Thus, when repeating the document page handling process, it is possible for the reference area and the target area to change from the prior document page handling process to the next document page handling process.

In the above descriptions, the timing requirement is regulated by computer 12. As described below, the timing requirement may be regulated by any one or more of projector 14, computer 12, and camera 18.

Figure 7:
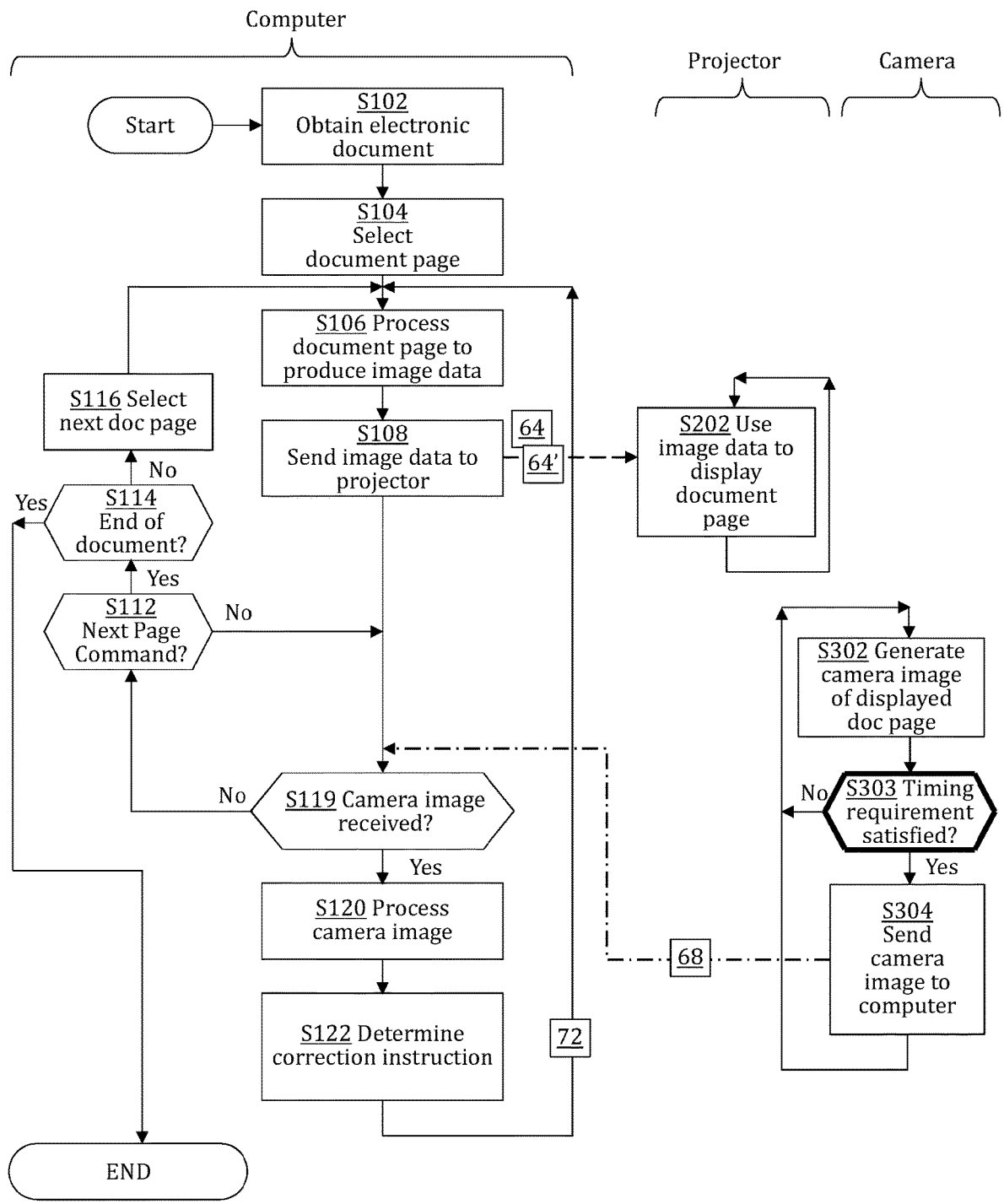
FIG. 7 is a flow diagram showing an example method for closed-loop color correction.

FIG. 7 shows an example method in which the timing requirement is regulated by camera 18. FIG. 7 is the same as FIG. 5 except as described here. In FIGS. 7, S110 and S118 are eliminated, and S303 and S119 are added. Computer 12 performs a color correction process only when it receives a camera image from camera 18. At S303, camera 18 determines whether to send a camera image to computer 12 based on whether a timing requirement is satisfied. For example, the timing requirement may be to send a camera image repeatedly at a constant time interval. By using an internal clock, camera 18 can determine whether a time interval has elapsed. Example time intervals given above for S110 also apply here. If the time interval has elapsed, camera 18 sends a camera image of the displayed document page to computer 12, and computer 12 processes the camera image at S120. If NO at S303, camera 18 does not send a camera image, and the process returns to S302 where camera 18 generates another camera image (an "additional camera image") of whatever is displayed on screen 16. The additional camera image could be an image of the same document page or a new document page.

Additionally or alternatively, the timing requirement at S303 may be to send a camera image only if there is a change in the camera image compared to a previous camera image. At S303, camera 18 determines whether there is a change in the camera image in terms of color property. A change in color property may occur when the sun sets or when sunlight becomes blocked by a moving cloud. In addition, a change in color property may occur when the user enters a next page command to presentation app 32 at S112. If YES at S303, camera 18 sends the camera image to computer 12 for use in identifying a target area.

As indicated above, the color correction process may be repeated on the same document page. The repeat color correction process is performed by computer 12 in response to receiving, by computer 12, an additional camera image of the displayed document page. At S303, camera 18 determines that the additional camera image differs in color from the camera image from the prior color correction process. The determination may be performed by camera 18 by comparing the color properties of the same area (e.g., a center area) in the additional camera image and the camera image from the prior color correction process. When camera 18 determines that there is a difference in color property, camera 18 sends the additional camera image to computer 12 for use in identifying a target area for the repeat color correction process.

Figure 8:
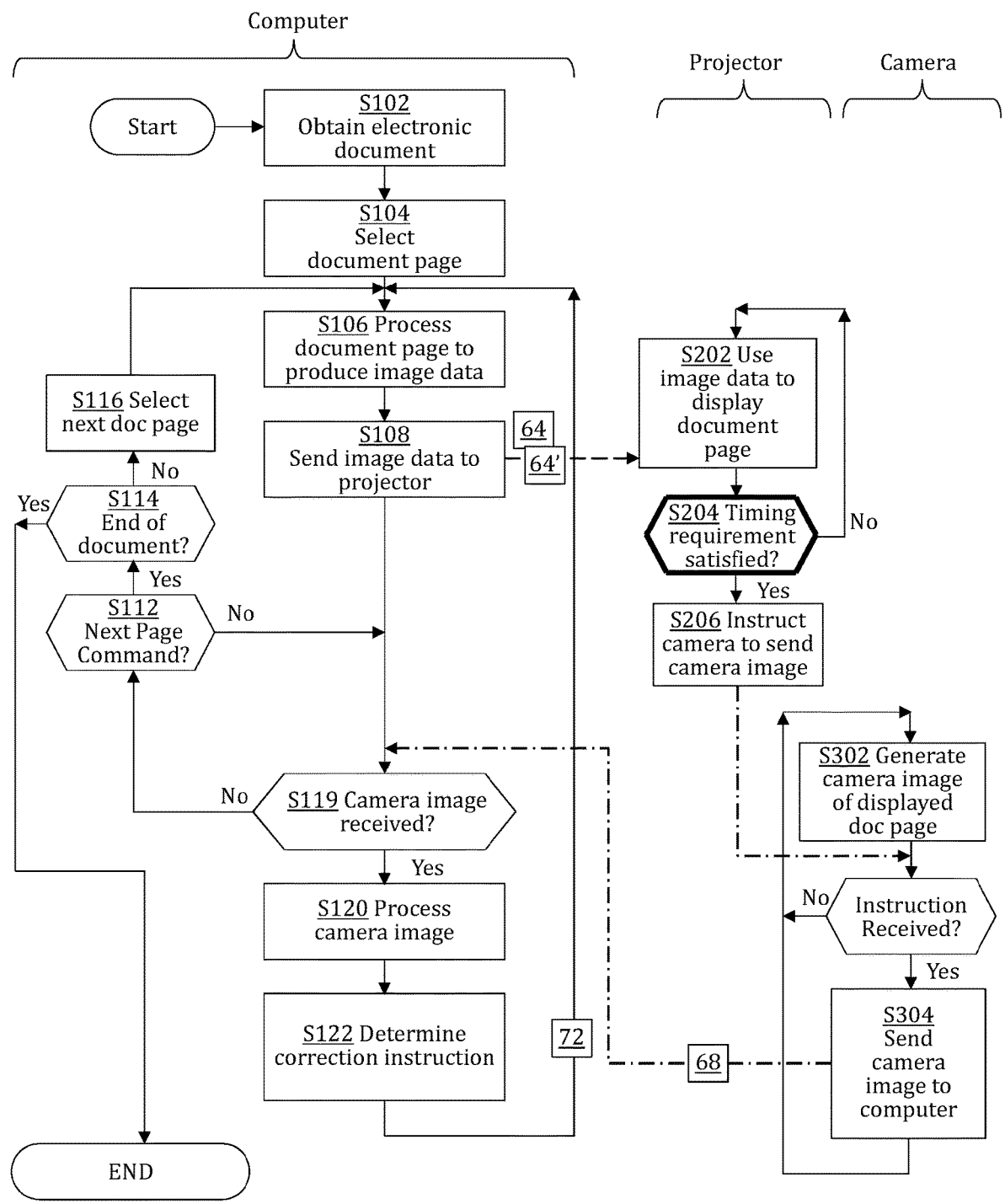
FIG. 8 is a flow diagram showing an example method for closed-loop color correction.

FIG. 8 shows an example method in which the timing requirement is regulated by projector 14. FIG. 8 is the same as FIG. 5 except as described here. In FIGS. 8, S110 and S118 are eliminated, and S204, S206 and S119 are added. Computer 12 performs a color correction process only when it receives a camera image from camera 18. In addition, camera 18 sends a camera image to computer 12 only when instructed by projector 14. At S204, projector 14 determines whether to instruct camera 18 to send a camera image based on whether a timing requirement is satisfied. For example, the timing requirement may be to instruct camera 18 repeatedly at a constant time interval. By using an internal clock, projector 14 can determine whether a time interval has elapsed. Example time intervals given above for S110 also apply here. If the time interval has elapsed, projector 14 instructs camera 18 to send a camera image of the displayed document page to computer 12. Camera 18 sends the camera image, and computer 12 processes the camera image at S120. If NO at S204, projector 14 does not instruct camera 18 to send a camera image. At S302, camera 18 generates another camera image (an "additional camera image") of whatever is displayed on screen 16. The additional camera image could be an image of the same document page or a new document page.

Additionally or alternatively, the timing requirement at S204 may be to instruct camera 18 to send a camera image only if there is a change in image data from computer 12. At S204, projector 14 determines whether there is a change in image data in terms of color property. If YES at S204, projector 14 instructs camera 18 to send a camera image to computer 12 for use in identifying a target area.

For example, a color correction process may be performed on document page 60. Next, the color correction process is performed again (repeated). The repeat correction process is performed on next document page 60N. This may occur when the user enters a next page command to presentation app 32 at S112, and then projector 14 determines that the image data sent by computer 12 to projector 14 differs from the image data sent by computer 12 to projector 14 during the prior color correction process. The determination may be performed by projector 14 by comparing the color properties of the same area (e.g., a center area) in the image data recently sent by computer 12 and the image data sent by computer 12 during the prior color correction process. When projector 14 determines that there is a difference in color property, projector 14 instructs camera 18 to send the additional camera image to computer 12 for use in identifying a target area for the repeat color correction process.

Figure 9:
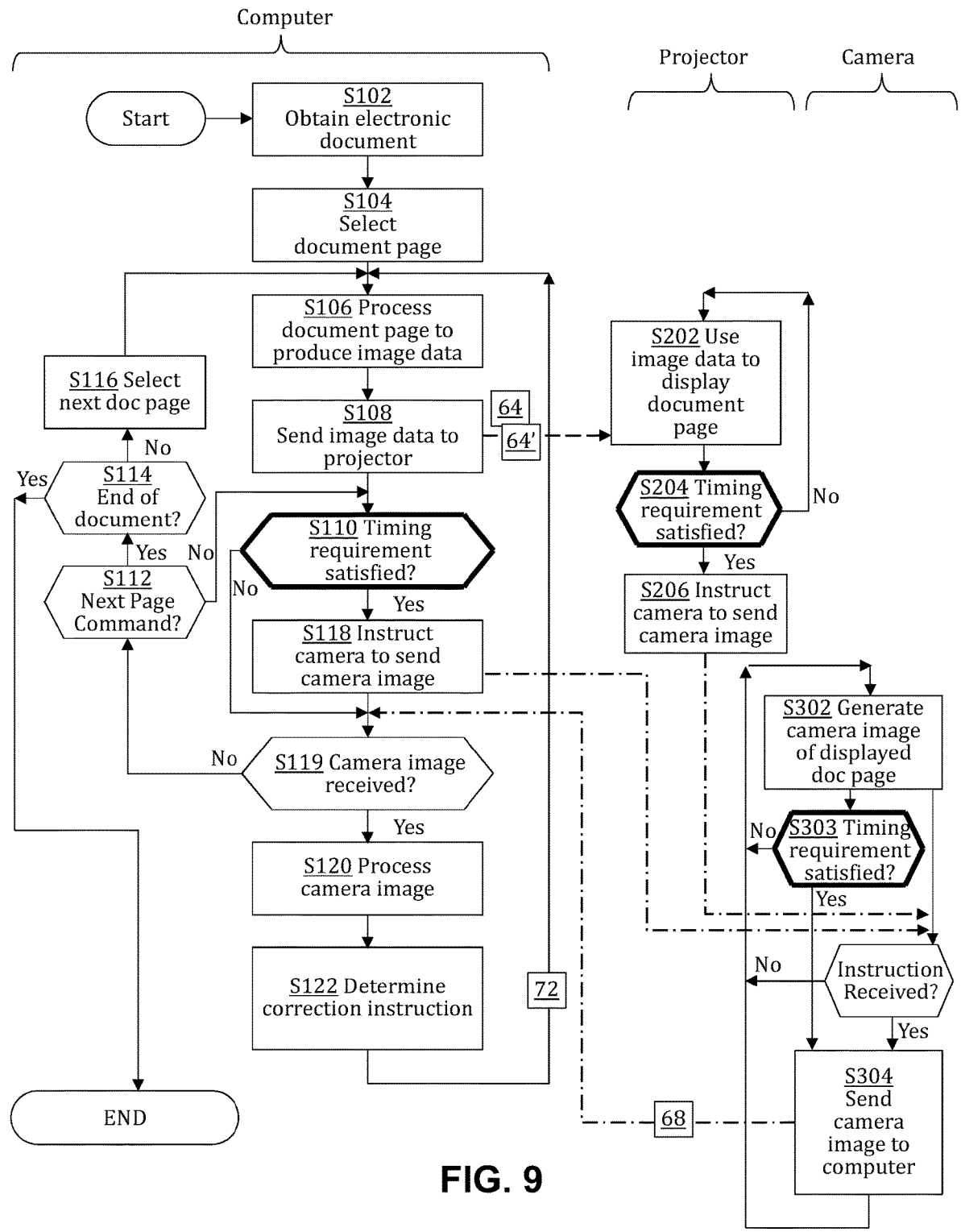
FIG. 9 is a flow diagram showing an example method for closed-loop color correction.

FIG. 9 shows an example method in which timing requirements are regulated by computer 12, projector 14, and camera 18. Computer 12 regulates a timing requirement according to S110 and S118 as previously described. Projector 14 regulates a timing requirement according to S204 and S206 as previously described. Camera 18 regulates a timing requirement according to S303 as previously described. The timing requirements at computer 12, projector 14, and camera 18 may differ from each other. For example, the timing requirement in computer 12 may be based on a constant time interval, the timing requirement in projector 14 may be based on a change of color property in image data, and the timing requirement in camera 18 may be based on a change of color property in the camera image.

Figure 10:
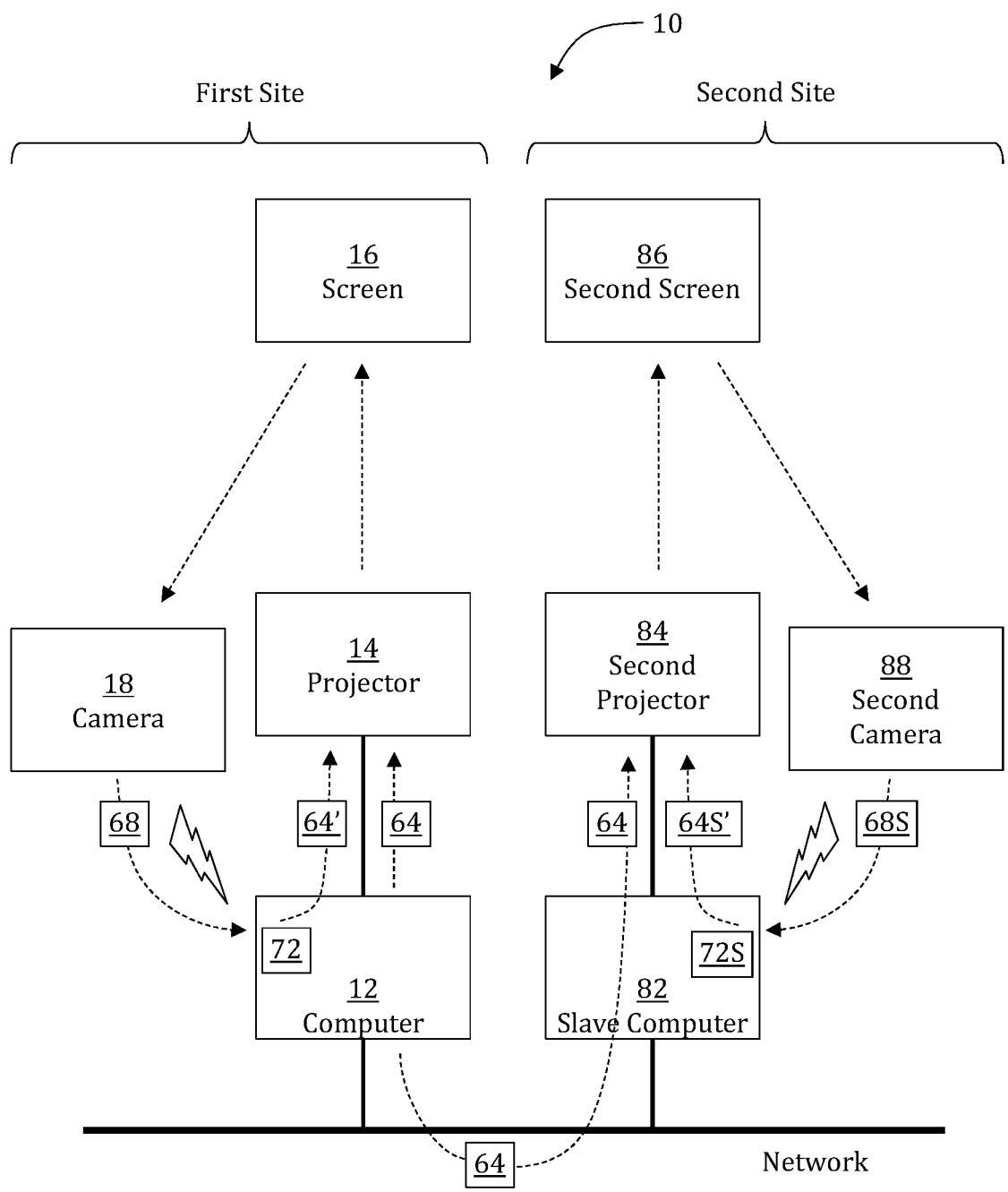
FIG. 10 is a diagram showing an example system for closed-loop color correction.

In FIG. 10, system 10 of FIG. 1 is enlarged with additional devices. Slave computer 82, second projector 84, second screen 86, and second camera 88 are added to system 10. Descriptions for slave computer 82, second projector 84, second screen 86, and second camera 88 are the same as those for computer 12, projector 14, screen 16, and camera 18, except as discussed below. The relationships between slave computer 82, second projector 84, second screen 86, and second camera 88 are similar to the relationships between computer 12, projector 14, screen 16, and camera 18. Computer 12, projector 14, screen 16, and camera 18 are located at a first site. Slave computer 82, second projector 84, second screen 86, and second camera 88 are located at a second site, such as another conference room. Computer 12 and slave computer 82 may be equipped with network interface cards that enable computer 12 to communicate with slave computer 82 via a network, which may include any of the Internet, a local area network (LAN), or other type of communication network.

For example, system 10 may be used for a video conference between two groups of people at different sites. The devices at the first site perform a color correction process (e.g., FIG. 5, 7, 8, or 9). The devices at the second site also perform a color correction process (e.g., FIG. 5, 7, 8, or 9), except the person in charge of the presentation (the presenter) is located at the first site and uses computer 12 to select the document page, which is displayed simultaneously on screen 16 and second screen 86. System 10 is configured such that second screen 86 always displays the same document page seen on screen 16. Since ambient conditions at the two locations are expected to be different, the color correction process at the second site (the "second color correction process") is performed separately from the color correction process at the first site.

In FIG. 10, computer 12 performs a document page handling process on a document page, including a color correction process. Computer 12 determines characteristics of reference area 62, and renders the document page to produce image data 64. Computer 12 sends image data 64 and the characteristics of reference area 62 to slave computer 82. Thereafter, computer 12 performs color correction, which involves identifying a target area in camera image 68 and generating corrected image data 64' based on a color difference between the reference area and the target area.

Meanwhile, slave computer 82 sends image data 64 to second projector 82, which is configured to use image data 64 to display the document page on second screen 86. For the second color correction process at the second site, slave computer 82 receives camera image 68S of the displayed document page on second screen 86. Slave computer 82 identifies a target area in received camera image 68S based on at least one of the characteristics of the reference area. The characteristics of the reference area are received from computer 12, so slave computer 82 does not need to analyze the document page to determine the characteristics. Slave computer 82 generates corrected image data 64S' (the "second corrected image data") based on a color difference between the reference area and the target area identified by the slave computer. Slave computer 82 does not obtain corrected image data 64' from computer 12. Due to differences in ambient conditions between the first and second sites, second corrected image data 64S' will differ from corrected image data 64'. Next, slave computer 82 sends second corrected image data 64S' to second projector 84, which uses it to display the document page on second screen 86 with reduced color shift.

In further detail, computer 12 uses camera image 68 to determine correction instruction 72 at S122. As previously discussed, document page 60 is rendered using correction instruction 72 to produces corrected image data 64' at S106. At the second site, slave computer 82 uses camera image 68S to determine correction instruction 72S at S122. Correction instruction 72S can have an effect of increasing the similarity in the color properties of reference area 62 and the target area in the next camera image from second camera 88.

To accomplish this, slave computer 82 may apply correction instruction 72S to image data 64 to produce second corrected image data 64S' at S106. Since slave computer 82 never received document page 60 from computer 12, slave computer 82 does not render document page 60 using correction instruction 72S.

In addition, it is possible for computer 12 to select a plurality of reference areas in document page 60. Computer 12 sends the characteristics of the reference areas to slave computer 82. For the color correction process at the first site, computer 12 identifies a plurality of corresponding target areas in camera image 68, each target area identified based on at least one of the characteristics of the corresponding reference area. Computer 12 iterates through matched pairs of reference and target areas to accumulate color adjustments to be included in correction instruction 72. For the color correction process at the second site, slave computer 82 identifies a plurality of corresponding target areas in camera image 68S from second camera 88, each target area identified based on at least one of the characteristics of the corresponding reference area. Slave computer 82 iterates through matched pairs of reference and target areas to accumulate color adjustments to be included in correction instruction 72S.

One will appreciate from the above descriptions that the color correction process herein may be performed at any time during a presentation using images that are truly part of the presentation. In this way, color shifts may be eliminated or reduced when ambient conditions change drastically during a presentation. The reference area used for color correction need not be a fixed calibration chart, which would be a distraction if displayed during the middle of the presentation. Some color shifts may not be very noticeable due to chromatic adaptation in human vision, so it would not be necessary to correct for color continuously in rapid succession. As an alternative to continuous color correction, color correction may be performed upon user command and/or at a constant time interval. Color correction may also be triggered by changes in image data received by a projector or changes in a picture of a projection screen taken by a camera. These timing requirements can help conserve computing resources that would otherwise be needed to find a reference area, process a camera image to find a corresponding target area, and produce corrected image data.

While several particular forms of the invention have been illustrated and described, it will also be apparent that various modifications may be made without departing from the scope of the invention. It is also contemplated that various combinations or subcombinations of the specific features and aspects of the disclosed embodiments may be combined with or substituted for one another in order to form varying modes of the invention. Accordingly, it is not intended that the invention be limited, except as by the appended claims.

What is claimed is:

1. A color correction method comprising:
    performing a document page handling process comprising
        processing, by a computer, a document page, the processing comprising
            selecting a reference area in the document page,
            determining characteristics of the reference area, and
            rendering the document page to produce image data;
        sending the image data to a projector configured to use the image data to project a projected image of the document page through the air and onto a screen; and
    performing a color correction process for the projected image, the color correction process comprising:
        receiving, by the computer, a camera image of the screen showing the projected image that was projected through the air and onto the screen,
        identifying a target area in the received camera image based on at least one of the characteristics of the reference area,
        generating corrected image data based on a color difference between the reference area and the target area, and
        sending the corrected image data to the projector, the projector configured to use the corrected image data to project a corrected projected image of the document page through the air and onto the screen;
    the method further comprising:
        repeating the color correction process another time, as a repeat color correction process, for the projected image, the repeat color correction process performed in response to receiving, by the computer and from the camera, an additional camera image of the screen showing the corrected projected image, wherein the additional camera image differs in color from the camera image from the prior color correction process;
    wherein the method further comprises, before the repeat color correction process:
        determining, by the camera, that the additional camera image differs in color from the camera image from the prior color correction process; and
        sending, by the camera, the additional camera image to the computer for use in identifying a target area for the repeat color correction process, wherein the sending is performed on condition that the additional camera image differs in color from the camera image from the prior color correction process.

2. The method of claim 1, wherein the selecting of the reference area comprises:
    determining that the reference area is uniform in color throughout the reference area; and
    determining that the reference area is of a size that satisfies a minimum size requirement.

3. The method of claim 1, wherein the determined characteristics of the reference area comprises a color property, and the identifying of the target area comprises:
    determining a color property of the target area; and
    comparing the color property of the reference area and the color property of the target area.

4. The method of claim 1, wherein the determined characteristics of the reference area comprises a boundary property of the reference area, and the identifying of the target area comprises matching the boundary property of the reference area to that of the target area.

5. The method of claim 1, further comprising:
    repeating the color correction process for the projected image, wherein
        the repeating is performed in response to a user command received by the computer, or
        the repeating is performed multiple times at a constant time interval.

6. The method of claim 1, wherein the document page is part of an electronic document that comprises additional document pages, and the method further comprises:
    repeating the document page handling process such that the document page handling process is performed at least once for each one of the additional document pages, wherein the reference area and the target area change from the prior document page handling process to the next document page handling process.

7. The method of claim 1, further comprising:
sending, by the computer to a slave computer, the image data and the characteristics of the reference area;
sending, by the slave computer, the image data to a second projector configured to use the image data to project a second projected image of the document page through the air and onto a second screen; and
performing a second color correction process for the second projected image on the second screen, the second color correction process comprising:
receiving, by the slave computer, a camera image of the second screen showing the second projected image,
identifying a target area, in the camera image received by the slave computer, based on at least one of the characteristics of the reference area,
generating second corrected image data based on a color difference between the reference area and the target area identified by the slave computer, and
sending the second corrected image data to the second projector, the second projector configured to use the corrected image data to project a second corrected projected image of the document page through the air and onto the second screen.

8. A color correction system comprising:
a computer;
a projector;
a screen; and
a camera, wherein
the computer performs a document page handling process comprising
processing a document page, the processing comprising
selecting a reference area in the document page,
determining characteristics of the reference area, and
rendering the document page to produce image data;
sending the image data to the projector, which is configured to use the image data to project a projected image of the document page through the air and onto the screen; and
performing a color correction process for the projected image, the color correction process comprising
receiving a camera image of the screen showing the projected image that was projected through the air and onto the screen,
identifying a target area in the received camera image based on at least one of the characteristics of the reference area,
generating corrected image data based on a color difference between the reference area and the target area, and
sending the corrected image data to the projector, which is configured to use the corrected image data to project a corrected projected image of the document page through the air and onto the screen,
wherein the document page handling process performed by the computer further comprises:
repeating the color correction process another time, as a repeat color correction process, for the projected image, the repeat color correction process performed in response to receiving, by the computer and from the camera, an additional camera image of the screen showing the corrected projected image, wherein the additional camera image differs in color from the camera image from the prior color correction process; and
before the repeat color correction process:
the camera determines that the additional camera image differs in color from the camera image from the prior color correction process; and
the camera sends the additional camera image to the computer for use in identifying a target area for the repeat color correction process, wherein the camera sends the additional camera image on condition that the additional camera image differs in color from the camera image from the prior color correction process.

9. The system of claim 8, wherein the selecting of the reference area comprises:
determining that the reference area is uniform in color throughout the reference area; and
determining that the reference area is of a size that satisfies a minimize size requirement.

10. The system of claim 8, wherein the determined characteristics of the reference area comprises a color property, and the identifying of the target area comprises:
determining a color property of the target area; and
comparing the color property of the reference area and the color property of the target area.

11. The system of claim 8, wherein the determined characteristics of the reference area comprises a boundary property of the reference area, and the identifying of the target area comprises matching the boundary property of the reference area to that of the target area.

12. The system of claim 8, wherein the document page handling process performed by the computer further comprises:
repeating the color correction process for the projected image, wherein
the repeating is performed in response to a user command received by the computer, or
the repeating is performed multiple times at a constant time interval.

13. A non-transitory computer readable medium having stored thereon computer readable instructions that, when executed by one or more processors of a system, cause the system to perform a color correction method, the system comprising a computer, a projector, a screen, and a camera, the color correction method comprising:
performing a document page handling process comprising
processing, by the computer, a document page, the processing comprising
selecting a reference area in the document page,
determining characteristics of the reference area, and
rendering the document page to produce image data;
sending the image data to the projector configured to use the image data to project a projected image of the document page through the air and onto the screen; and
performing a color correction process for the projected image, the color correction process comprising:
receiving, by the computer, a camera image of the screen showing the projected image that was projected through the air and onto the screen,
identifying a target area in the received camera image based on at least one of the characteristics of the reference area,
generating corrected image data based on a color difference between the reference area and the target area, wherein the color difference between the reference area and the target area is determined based on a distance measurement between color properties of the target and reference areas in a multi-dimensional color space, and sending the corrected image data to the projector, which is configured to use the corrected image data to project a corrected projected image of the document page through the air and onto the screen.

* * * * *